Sept. 30, 1958     H. E. SIVERSON     2,854,041
SAW CHAIN
Filed Jan. 29, 1957     2 Sheets-Sheet 1
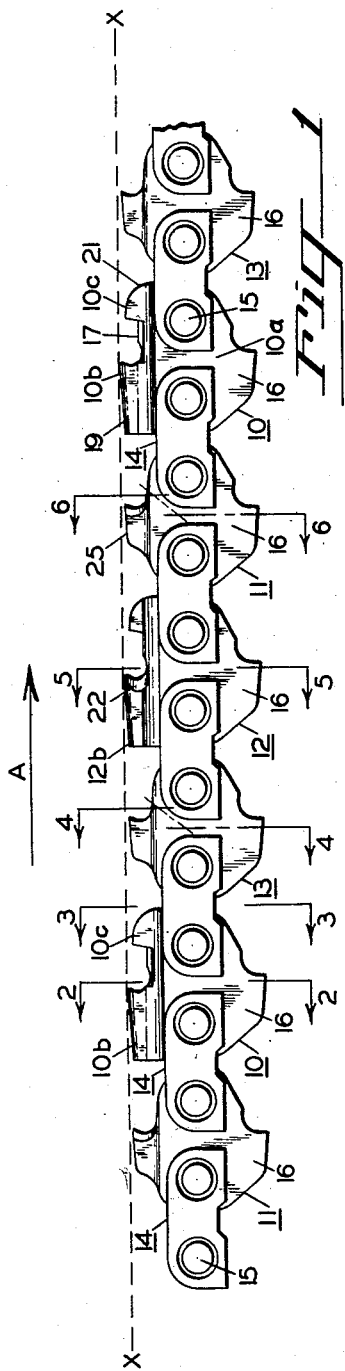
INVENTOR.
HARRY E. SIVERSON
BY
ATTORNEY

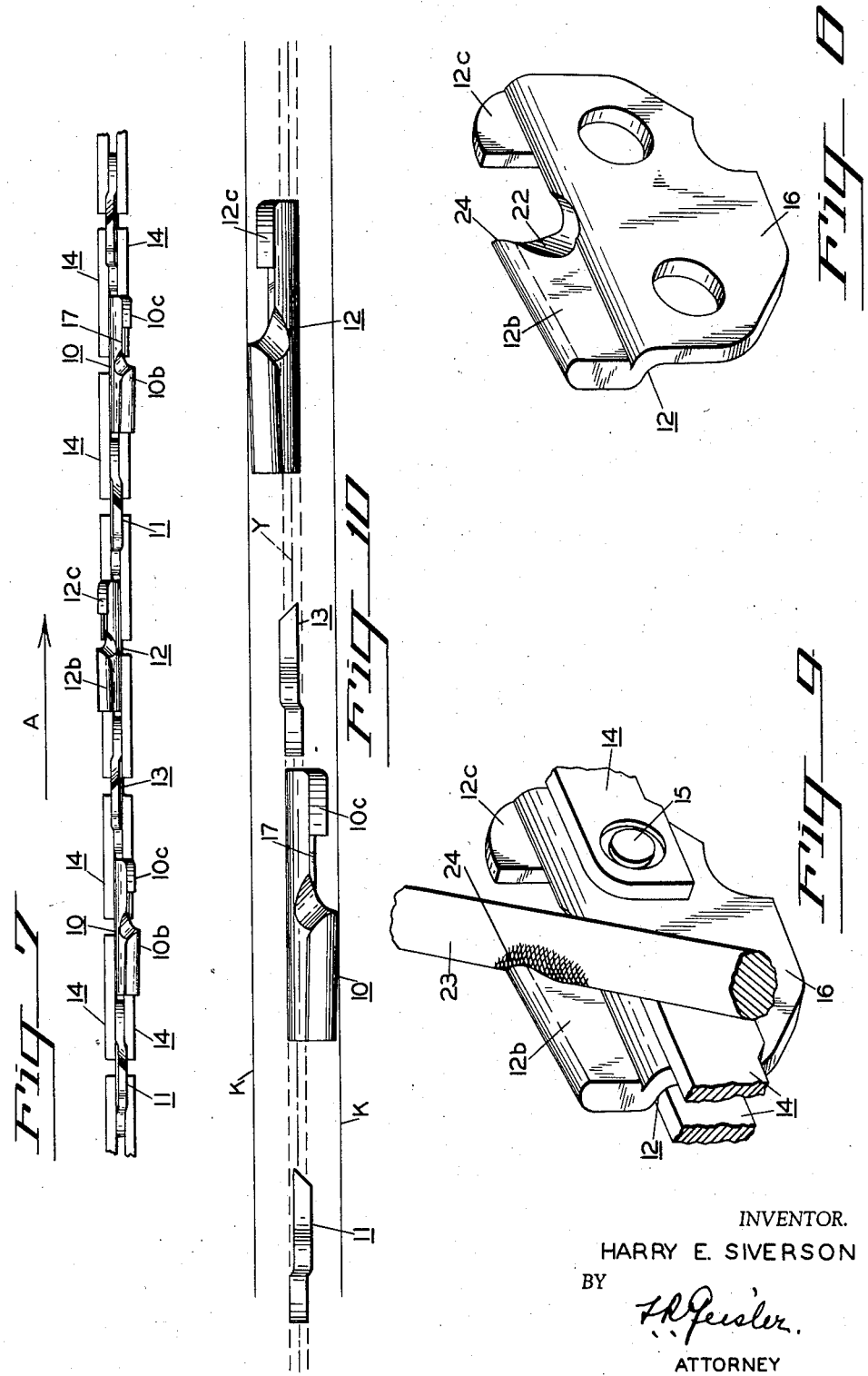

United States Patent Office 2,854,041
Patented Sept. 30, 1958

2,854,041

SAW CHAIN

Harry E. Siverson, Portland, Oreg., assignor to Beaver Saw Chain Corp., Portland, Oreg., a corporation of Oregon Application January 29, 1957, Serial No. 637,025

3 Claims. (Cl. 143—135)

This invention relates to saw chains and, more particularly, to saw chains designed for use in power-driven wood-cutting chain saws.

In such saw chains, wherein certain links of the endless chain or saw belt provide the necessary cutting elements, it is customary to have the cutting elements or teeth alternately of so-called right and left configuration so that alternate teeth will cut opposite sides in the kerf in the wood, the reasons for which are obvious. Also it is customary to provide riders or depth gauges for the cutting teeth, preferably formed integral with the cutting teeth and spaced a short distance ahead of the respective cutting edges or working portions of the teeth, so as to limit the cutting depth for each tooth during its passage along the kerf and in this way to restrain the tendency for individual teeth to gouge too deeply into the wood.

In addition to the use of depth gauges for the individual teeth, several other improvements have been made in saw chains and saw chain teeth in efforts to provide more efficient and more durable working portions for the teeth and in order to obtain a better balancing of the load imposed on each tooth. In many saw chains raker teeth have been added to aid in removing the chips and sawdust from the kerf.

Although a main object of all these improvements has been to achieve a smoother operation of the chain saw as well as to obtain more efficiency in cutting, modern wood cutting chain saws still leave much to be desired as far as smoothness of operation is concerned.

I have observed that, with the customary cutting of the wood alternately on opposite sides of the kerf by saw chain teeth links, the chips produced by the pairs of teeth are relatively large, and that even when the individual teeth embody improvements as taught in some of the recent patents in the art, considerable vibration and jerkiness of the chain saw occurs as these chips are produced. This undesirable characteristic becomes very apparent when the speed of the chain saw is reduced. On the other hand, I have discovered that if the chips which are cut by the teeth are reduced in size, but increased in number, more smoothness and in general a more satisfactory sawing operation will result.

An object of the present invention is to provide an improved saw chain assembly for a power-driven wood cutting chain saw with which a smoother, as well as a better, cutting operation will be attainable.

A related object of the invention is to provide an improved saw chain which will cut more freely, with less noticeable gouging and tearing, and thus with less resistance.

A specific object of the invention is to provide an improved saw chain in which the chips cut by the teeth will be cut into smaller pieces while being proportionately increased in number.

A further object of the invention is to provide a saw chain in which greater balancing of the load and less vibration will be a contributing factor in decreasing the wear and in adding to the stability of the saw.

These objects and other incidental advantages are attained through the improved construction and arrangement of the individual members of the saw chain in the manner hereinafter briefly described and explained.

In the following description and explanation reference is made to the accompanying drawings wherein:

Figure 1 is a side elevation of a portion of a saw chain embodying the present invention;

Figure 2 is a section taken on line 2—2 of Figure 1 and drawn on an enlarged scale;

Figure 3 is a section on line 3—3 of Figure 1 and drawn on an enlarged scale;

Figure 4 is a section on line 4—4 of Figure 1 and drawn on an enlarged scale;

Figure 5 is a section on line 5—5 of Figure 1 and drawn on an enlarged scale;

Figure 6 is a section on line 6—6 of Figure 1 and drawn on an enlarged scale;

Figure 7 is a top plan view of the portion of the saw chain of Figure 1;

Figure 8 is a perspective view of one of the cutting tooth links on an enlarged scale, showing the same entirely removed from the saw chain;

Figure 9 is a similar perspective view of the same cutting tooth in the chain and illustrating the manner in which the sharpening of the teeth of the saw chain is performed; and Figure 10 is a fragmentary, enlarged and partly schematic plan illustrating the relative inverted cutting positions of the individual teeth with respect to the kerf which is being cut in the wood.

In Figures 1 and 7 the saw chain illustrated comprises a series of four center links 10, 11, 12 and 13 joined consecutively by pairs of identical side links 14. The pairs of side links have pivotal connections with the center links which they join and the side links are held together by the pins 15. Preferably the side links are formed with recesses to accommodate the heads of the pins 15 so as to enable the overall width of the saw chain to be kept to a minimum. In Figures 1 and 7, the arrow A indicates the relative direction traveled by the saw chain when in operation.

All of the center links are formed with identical sprocket tooth portions 16 on the inner or non-working edge of the saw (this being the bottom edge of the portion of the saw chain when in the position illustrated in Figure 1), the purpose of these sprocket teeth being to provide the necessary engagement with the customary driving sprocket (not shown) of the chain saw.

The center links 10 and 12 constitute the main cutting teeth links, although the other center links 11 and 13, hereinafter referred to as raker tooth links, are merely as "rakers," also do some cutting, as will be later explained. The cutting tooth links 10 and 12, as viewed from the left in Figure 1, might be further described as right and left cutters, respectively.

The cutting tooth link 10 (Figures 1, 2, 3 and 7) includes a flat body portion 10a, extending along in the median plane of the saw chain, with a working portion 10b, deformed to one side of the median plane, and also with a rider or depth gauge portion 10c, offset to the same side and spaced a slight distance ahead of the working portion 10b and separated therefrom by the arcuate recess 17.

Preferably, but not necessarily, the working portion 10b is reinforced by being formed with increased or double thickness of metal. This may be done by welding on an extra strip of metal along this working portion or it can be done more satisfactorily by folding over an extended edge portion on itself in the manner described in my U. S. Patent No. 2,713,276 issued under date of July 19, 1955, and entitled "Saw Chain Tooth."

Regardless of whether this working portion 10b is of double or single thickness, the outer surface of the working portion extends laterally outwardly and upwardly, as shown at 18 in Figure 2, and then curves inwardly over the ridge line 19 and finally terminates in an inner edge 20 which lies substantially in the median plane of the saw chain. From Figure 1 it will be noted that the ridge line 19 slopes slightly downwardly towards the rear of the tooth, as is customary, in order to reduce the wear on the working portion of the tooth. From Figure 2 it will be noted that the outer side edge 18 extends sufficiently out beyond the side of the body portion of the chain to allow for proper clearance for the chain on that side in the kerf which is cut in the wood.

The rider or depth gauge portion 10c on the cutting tooth link 10 (see Figure 3), while being offset to the same side as the working portion of the tooth link, does not extend out to the side as far from the median plane of the saw chain as the edge 18, and, as is well known, this portion of the tooth serves merely as a gauge to limit the depth of the cut which will then be made by the cutting or working portion of the tooth. In Figure 1 the depth of the cut which the gauge portion 10c permits is indicated relatively by the space shown between the top of the gauge portion 10c and the cutting tip line X. The front edge of the gauge portion 10c is rounded, as shown at 21 in Figure 1, to facilitate the riding of this portion along the bottom of the kerf.

The cutting tooth link 12 of each group is similar to the cutting tooth link 10 except that its working portion 12b is offset to the opposite side and its cutting face slopes in an opposite oblique direction as apparent from Figure 7. The formation of these two main cutting tooth links is shown more clearly in the perspective view of the cutting tooth link 12 in Figures 8 and 9. It will be noted that the cutting face 22 of the working portion of the tooth is sharpened by filing with a cylindrical round file 23 (Figure 9). For most saw operations this sharpening is done with the file held at a 45° angle with respect to the median plane of the saw chain, although a slight change of angle may be desirable for specific conditions. The edge on the front face 22 is thus formed into a hollow ground chisel surface with the curved chisel edge extending to a toe or tip 24 and then turned inwardly. Thus the two cutting tooth links 10 and 12 have their cutting faces oppositely sloped, their faces sloping forwardly obliquely towards the sides of the saw chain to which the working portions of the teeth are offset. Consequently, for sharpening one of these two cutting tooth links the file is held at an angle supplementary to the angle at which it is held for sharpening the other cutting tooth link, with respect to the median plane of the saw chain, or, in other words the file is held at the same angle for each tooth but the angle is located on opposite sides of the median plane of the saw chain.

The raker tooth link 11 (Figures 1 and 6) preferably, although not necessarily, is offset very slightly (for example about 1/64 to 1/32 of an inch), on the same side. Its ridge line 25, like the ridge line 19 of the cutting tooth link 10, slopes downwardly rearwardly, having approximately the same slope as the cutting tooth ridge line, but the ridge line of the raker tooth does not extend to the cutting tip line X of the cutting teeth (as shown in Figure 1). The same is true of the raker tooth link 13 (Figure 4) which follows the cutting tooth link 12, and which will then be slightly offset on the same side as the cutting tooth link 12. The two raker tooth links 11 and 13 are similar but have their cutting faces oppositely sloped, as shown best in Figure 7. Since the raker tooth links 11 and 13 (Figure 1) do not extend to the line X of the main cutting teeth 10 and 12, the raker teeth do not of themselves require any additional riders or depth gauges. The front cutting faces 26 and 27 of the raker tooth links 11 and 13 are sharpened with the same cylindrical file as their related cutting tooth links 10 and 12 respectively, but with the cutting face of each raker tooth link sloped oppositely from that of its related cutting tooth link. Thus the cutting face of the raker tooth 11 slopes oppositely from that of its related cutting tooth link 10, the cutting face of the cutting tooth link 12 slopes oppositely from that of cutting tooth link 10 and consequently in the same direction as that of raker tooth 11, while the cutting face of raker tooth 13 slopes oppositely from that of its related cutting tooth 12 and in the same direction as that of cutting tooth 10.

In the operation of the saw the cutting tooth 10 makes a cut on one side of the kerf, its operation being limited to approximately one half the kerf area. Ordinarily the wood chip started by the cutting action of one tooth would not become freed from the body of the wood until the next cutting tooth reached the cut and completes the cut correspondingly on the opposite side of the kerf. With the present improved saw chain, however, the raker 11, by cutting oppositely along the approximate center line of the kerf, cooperates with the cutting tooth 10 in the cutting and freeing of a chip from half the kerf area without any aid from the second cutting tooth 12.

The raker 13 cooperates with its cutting tooth 12 similarly in the cutting of a half size chip, in the same manner as raker 11 cooperates with its cutting tooth 10, and the chip from the cutting tooth 12 and its raker 13 is released from the kerf on the opposite side from that on which the chip cut by the cutting tooth 10 and its cooperating raker 11 was released.

In this manner a half size chip is produced from the kerf and released on one side by each main cutting tooth link with the cooperation of its companion raker, instead of following the usual procedure wherein a larger chip would be cut and released by the joint action of two main cutting teeth from both sides of the kerf. The cutting work performed by each raker is limited to completing the cutting and freeing of the chip produced from half the kerf, with most of the cutting of such half size chip being done by the related preceding cutting tooth link. Consequently, the rakers themselves perform considerably less cutting than the main right and left cutting teeth. But the fact that the rakers act also as cutters and perform the function of releasing the half size chips is a very important feature, and the cutting which they perform is necessary in the carrying out of the invention whereby smaller size chips in greater number are obtained as a result of the operation of the saw. In addition, the rakers perform their customary function of helping to clear the kerf of the loosened and broken chips and sawdust.

The cutting performed by each raker in conjunction and cooperation with its preceding main cutting tooth also eases the burden on the next succeeding main cutting tooth inasmuch as the freeing of a chip from half of the kerf has the additional advantage of facilitating the cutting of a chip from the other half of the kerf area.

The spacing, in the longitudinal direction of the saw chain travel, between a main cutting tooth and its companion cutting raker will be only approximately half the spacing ordinarily occurring between successive cutting teeth in saw chains of the same weight as heretofore constructed, and the cooperative cutting done by the rakers has the same general effect in increasing the smoothness of saw operation as might be obtained by increasing the number of main cutting teeth in the saw. On the other hand, since the raker teeth are lighter in weight than the main cutting teeth and actually perform less cutting work, this improved smoothness of operation is obtained without adding as much weight to the saw chain and without as much additional load on the saw as would result from such increase in the number of main cutting teeth. It will be noted also that, since smaller chips are cut in greater number while being cut alternately opposite sides, the cutting teeth in this improved saw chain have less tendency to move laterally, as, for example, moving outwardly to gouge into the wood and springing back towards the median plane, as the chips are torn free. This reduced tendency to move laterally together with the reduced load on the individual teeth are contributing factors in obtaining the improved smoothness of operation of the saw.

In the fragmentary and somewhat schematic plan view of Figure 10, K indicates the kerf which is being cut in the wood, it being assumed that the plan view of the teeth is taken from the bottom of the kerf. The center line of the kerf is indicated at Y. Thus, the main cutting teeth 12 and 10 are shown cutting along opposite sides of the kerf K, these main cutting teeth having integral, slightly offset depth gauges 12c and 10c respectively, and each main cutting tooth is followed by its companion cooperating raker cutting tooth which completes the cutting and freeing of a chip on one side of the kerf. In this way the cutting of two smaller chips occurs in place of the cutting of a single larger chip over substantially the entire width of the kerf. The inner cutting edges of the raker teeth 11 and 13 overlap slightly, that is to say, they extend slightly beyond the centerline Y of the kerf, preferably not more than $\frac{1}{64}$ to $\frac{1}{32}$ of an inch. This insures complete freeing of each chip from one half of the kerf.

While variations may be made in the relative sizes of the rakers and main cutting teeth, I have found that very satisfactory results, as regards smoothness of operation, cutting efficiency, and minimum chain wear, are obtained with this improved saw chain, for average cutting, when the depth gauge portions 10c and 12c of the main cutting links 10 and 12 (Figure 1) are set .035 of an inch below the tip line X of the cutting portions 10b and 12b and when the tips of the cutting faces of the rakers 11 and 13 are set .015 of an inch below this tip line X. Thus, in the carrying out of the invention the cutting tips of the rakers do not extend up to the line of the tips of the main cutting teeth but preferably extend above the line of the depth gauges. The relative distances between the tip line X of the main cutting teeth and the line of the cutting tips of the rakers and between the tip line X and the depth gauges, when decided upon for a particular saw chain, should then of course be maintained in the event of subsequent sharpening of the saw. For this purpose a suitable depth filing guide should be employed to insure the uniform jointing of the depth gauges.

I claim:

1. In a saw chain of the character described having center links consisting of main cutting teeth and raker teeth, with pairs of side links connecting the center links, and having the working portions of said main cutting teeth offset alternately to opposite sides, the main cutting teeth being arranged alternately with said raker teeth, a front face on the working portion of each main cutting tooth having a chisel cutting surface sloping obliquely inwardly and rearwardly from the outer lateral edge of said working portion of said main tooth and terminating in the median plane of the saw chain, the raker tooth immediately following each main cutting tooth having a working portion located mainly in the median plane of the saw chain and having a front chisel cutting surface on said working portion similar to that of the preceding main cutting tooth but sloping in the opposite oblique direction, and said main cutting teeth and said raker teeth so arranged that the path of each main cutting tooth and of its raker tooth will overlap slightly, whereby each raker tooth will cooperate with its preceding companion cutting tooth in cutting and freeing a chip from one side of the saw kerf only, thereby increasing the number and decreasing the size of the chips cut by the main cutting teeth of the saw chain and improving the smoothness of operation of the saw.

2. In a saw chain of the character described having center links consisting of main cutting teeth and raker teeth, with pairs of side links connecting the center links, and having the working portions of said cutting teeth offset alternately to opposite sides, said main cutting teeth and said raker teeth arranged alternately in said chain, a front face on the working portion of each main cutting tooth having a hollow ground chisel cutting surface sloping obliquely inwardly and rearwardly from the outer lateral edge of said working portion of the tooth and terminating in the median plane of the saw chain, the raker tooth immediately following each cutting tooth having a working portion located mainly in the median plane of the saw chain and having a front hollow ground chisel cutting surface similar to that of the preceding main cutting tooth but sloping in the opposite oblique direction, the working portions of said raker teeth being of less thickness than those of said main cutting teeth, and the path of each main cutting tooth and of its raker tooth overlapping slightly, whereby each raker tooth will cooperate with its preceding companion main cutting tooth in cutting and freeing a chip from one side of the saw kerf only, thereby increasing the number and decreasing the size of the chips cut by the main cutting teeth of said saw chain and improving the smoothness of operation of the saw.

3. In a saw chain of the character described having center links consisting of main cutting teeth and raker teeth, with pairs of side links connecting the center links, and having the working portions of said main cutting teeth offset alternately to opposite sides, said main cutting teeth and said raker teeth arranged alternately in said saw chain, a front face on the working portion of each main cutting tooth having a hollow ground chisel cutting surface sloping obliquely inwardly and rearwardly from the lateral edge of said working portion of the tooth and terminating in the median plane of the saw chain, the raker tooth immediately following each cutting tooth having a working portion located mainly in the median plane of the saw chain and having a front hollow ground chisel cutting surface identical to that of the preceding main cutting tooth but sloping in the opposite direction, the working portion of each raker tooth being offset to the same side as, but to a less extent than, the working portion of each preceding main cutting tooth, and the path of each main cutting tooth and of its raker tooth overlapping slightly, whereby each raker tooth will cooperate with its preceding companion main cutting tooth in cutting and freeing a chip from one side of the saw kerf only, thereby increasing the number and decreasing the size of the chips cut by the main cutting teeth of said saw chain and improving the smoothness in operation of the saw.

References Cited in the file of this patent

UNITED STATES PATENTS

| | | |
|---|---|---|
| 2,565,502 | Johanson | Aug. 28, 1951 |
| 2,651,336 | Warren | Sept. 8, 1953 |
| 2,713,276 | Siverson | July 19, 1955 |
| 2,796,895 | Van Ranst | June 25, 1957 |